United States Patent
Yan et al.

(10) Patent No.: US 9,794,832 B2
(45) Date of Patent: Oct. 17, 2017

(54) DEVICE MANAGEMENT IN A MIXED WIRELESS COMMUNICATION SYSTEM

(71) Applicant: Apple Inc., Cupertino, CA (US)

(72) Inventors: Yaoqi Yan, Beijing (CN); Qiang Miao, Beijing (CN); Jianxiong Shi, Dublin, CA (US); Wenping Lou, Beijing (CN); Zhiwei Wang, Beijing (CN); Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 14/503,229

(22) Filed: Sep. 30, 2014

(65) Prior Publication Data
US 2016/0095021 A1    Mar. 31, 2016

(51) Int. Cl.
*H04W 36/00* (2009.01)
*H04W 4/02* (2009.01)

(52) U.S. Cl.
CPC ....... *H04W 36/0022* (2013.01); *H04W 4/028* (2013.01); *H04W 36/0088* (2013.01)

(58) Field of Classification Search
CPC ............. H04W 36/0022; H04W 4/028; H04W 36/0088

USPC ........................................ 455/437, 436, 434
See application file for complete search history.

(56) References Cited

U.S. PATENT DOCUMENTS

| | | | |
|---|---|---|---|
| 8,320,918 B2* | 11/2012 | Lee ...................... | H04W 36/32 455/435.1 |
| 9,049,609 B1* | 6/2015 | Reeves ................. | H04W 24/02 |
| 2010/0003980 A1* | 1/2010 | Rune ..................... | H04W 48/16 455/436 |
| 2013/0301466 A1* | 11/2013 | Nenner ............. | H04W 36/0022 370/252 |
| 2015/0003228 A1* | 1/2015 | Choi ................... | H04W 76/028 370/216 |
| 2015/0146685 A1* | 5/2015 | Han ...................... | H04W 36/30 370/331 |

* cited by examiner

*Primary Examiner* — Chuck Huynh
(74) *Attorney, Agent, or Firm* — Meyertons, Hood, Kivlin, Kowert & Goetzel, P.C.

(57) ABSTRACT

A method, system, and apparatus are described for managing a device in a mixed wireless communication system. A device may decide to scan or not scan for a cell based on (or at least on) updating information. The updating information may be used together or individually. The updating information may be maintaining a time window in conjunction with a device's motion status, maintaining a list that tracks cell identity in areas of non-service, or utilizing network deployment information.

20 Claims, 10 Drawing Sheets

DEVICE MANAGEMENT IN A MIXED WIRELESS COMMUNICATION SYSTEM

BACKGROUND

Field of the Application

The disclosure is directed to wireless communications and, more particularly, to managing a device in a mixed wireless communication system.

Background of the Disclosure

Wireless communication systems are widely deployed to provide various communication services, such as: voice, video, packet data, circuit-switched info, broadcast, messaging services, and so on. There are different types of communication systems deployed that may provide different services to devices. For example, LTE provides high-speed data services while CDMA2000 provides high quality voice services. A mixed wireless communication system may exist when various service providers cover congruent areas. Devices may have the capability to support several of these services on a single device. For example, a mobile phone may be LTE, Bluetooth®, GSM, and Wi-Fi enabled. Moreover, these various systems may evolve over time and/or be newly deployed creating intermittent connectivity issues, service quality issues, and other related problems. For example, LTE, a standard for wireless communication of high-speed data, is a packet-based (or packet-switched) internet protocol (IP) network that cannot support circuit-switched calls. Thus, if a voice centric device wants to make a voice call on an LTE network, it needs to be able to utilize a voice supported communication system.

Circuit Switched Fall Back (CSFB) technology was developed so that a voice call or a SMS message being delivered to an LTE device could work via the use of another circuit-switched network (e.g., GSM, etc.). With CSFB, when an LTE device is used to make or receive a voice call, the device "falls back" to a 3G or 2G network to complete the call or to deliver the SMS message. Some LTE networks that are deployed support CSFB and some do not. Therefore, problems can arise when a voice centric device is on an LTE network that does not support CSFB. A voice centric device on a non-CSFB LTE network may temporality disable its LTE connection and use a voice supported network. However, the device may try shortly afterwards to reconnect to an LTE network by scanning to see if an LTE network is available. The device may still be in an area where a non-CSFB LTE network is located and continue to make frequent unnecessary LTE scans.

Frequent scanning consumes valuable device power. Conversely, waiting too long to scan may cause the voice centric device to miss the chance to reconnect to a CSFB supported LTE network. A user may experience slower data services as a result or other inconvenient problems that may affect the user's experience. An incomplete solution sometimes used to address these potential problems is the use of a simple scan timer, which could be used to indicate when a device would scan. When the scan timer expired, the device would scan. However, this overly-simple and incomplete solution is inefficient and does not fully solve the potential problems addressed.

Therefore, what is needed is a method, system, and apparatus for managing a device in a mixed wireless communication system are needed.

BRIEF DESCRIPTION OF THE DRAWINGS

The following embodiments may be better understood by referring to the following figures. The figures are presented for illustration purposes only, and are therefore not limiting.

DETAILED DESCRIPTION

The following detailed description is directed to certain embodiments. However, the disclosure can be embodied in a multitude of different ways as defined and covered by the claims. In this description, reference is made to the drawings wherein like parts are designated with like reference numerals within this application. The disclosed embodiments describe a method, system, and apparatus for managing a device in a mixed wireless communication system.

This disclosure makes reference to various wireless communication devices, such as access point, mobile device, base station, user equipment, Node B, access terminal and eNB. The use of these and other names is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Various techniques described herein can be used for various wireless communication systems, such as Code Division Multiple Access ("CDMA") systems, Multiple-Carrier CDMA ("MC-CDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, CDMA2000, IS-856, W-CDMA, TDSCDMA, and other standards. A CDMA network may implement a radio technology such as Universal Terrestrial Radio Access ("UTRA)", CDMA2000, or some other technology. UTRA includes W-CDMA and Low Chip Rate ("LCR"). The CDMA2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("Wi-Fi"), IEEE 802.16 "(Wi-MAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99 . . . Rel8 . . . Rel10, etc.) technology, as well as 3GPP2 (1xRTT, 1xEV-DO . . . RevB, etc.) technology and other technologies, such as Wi-Fi, WiMAX, WMBA and the like.

Figure 1:
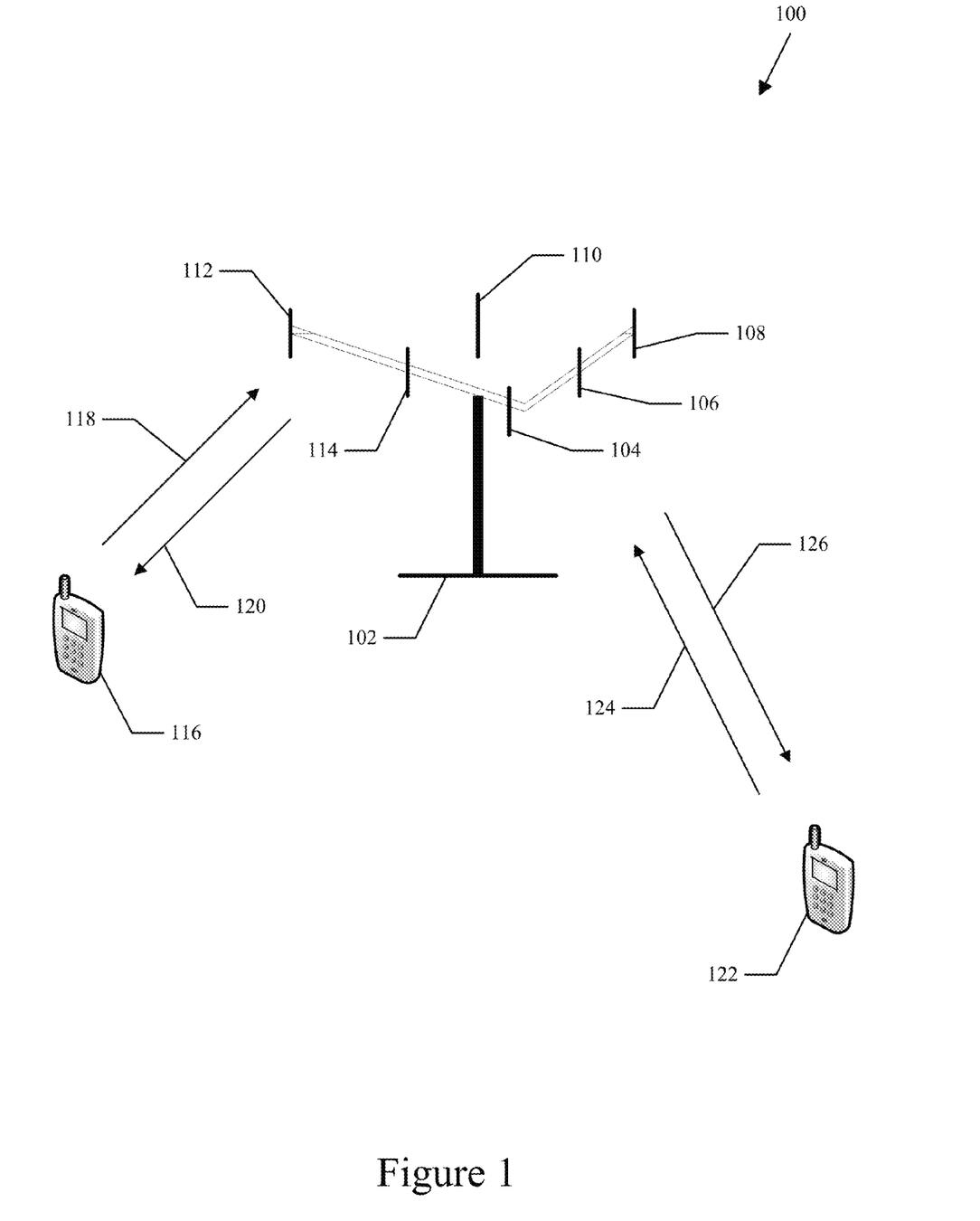
FIG. 1 illustrates an exemplary wireless multiple-access communication system according to certain embodiments.

Referring now to the drawings, FIG. 1 illustrates an exemplary wireless multiple-access communication system 100 according to certain embodiments. In one example, an evolved Node B (eNB) 102 or base station includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from US 122 over uplink 124. In a frequency division duplex (FDD) system, communication links 118, 120, 124 and 126 can use different frequencies for communication. In time division duplex (TDD) systems, the communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
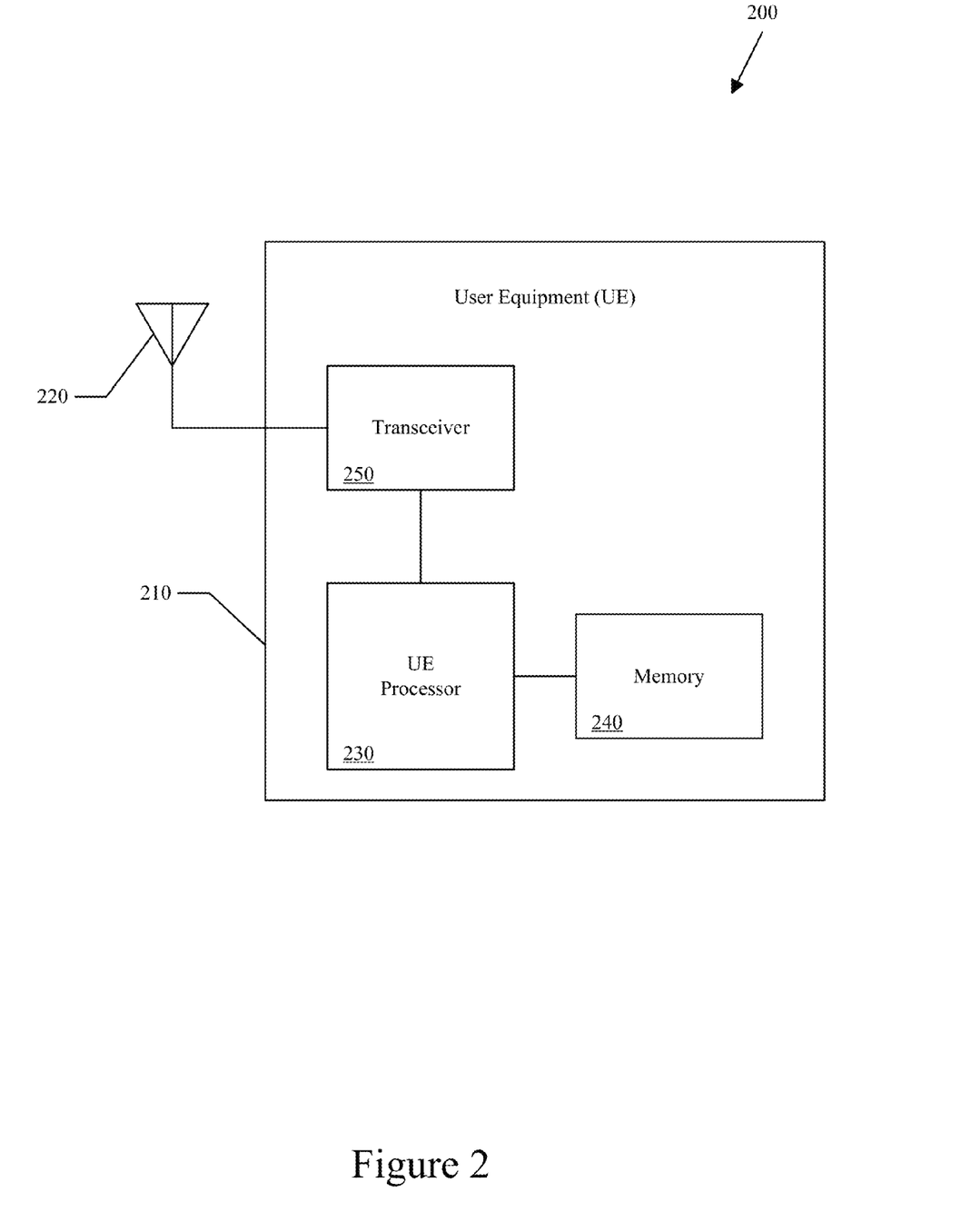
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 250, an antenna 220, a processor 230, a memory 240 (which, in certain embodiments, may include memory in a Subscriber Identity Module (SIM) card), a Global Positioning System (GPS) receiver or Satellite Positioning Services receiver (SPS), various sensors (e.g. accelerometers, pressure sensors, temperature sensors, etc.), and a local area network (LAN) transceiver, or a personal area network (PAN) transceiver, or a wireless local area network transceiver (WLAN), any combination of a local network transceiver or equivalent transceiver 250. In certain embodiments, some or all of the functionalities described herein as being performed by mobile communication devices may be provided by processor 230 executing instructions or code stored on a computer-readable medium, such as the memory 240, as shown in FIG. 2. Additionally, UE 210 may perform uplink and/or downlink communication functions, as further disclosed herein, via transceiver 250 and antenna 220. While only one antenna is shown for UE 210, certain embodiments are equally applicable to multi-antenna mobile devices. In certain embodiments, UE 210 may include additional components beyond those shown in FIG. 2 that may be responsible for enabling or performing the functions of UE 210 as is well known in the art, such as communicating with a base station in a network and for processing information for transmitting or from reception, including any of the functionality described herein. Such additional components are not shown in FIG. 2 but are intended to be within the scope of coverage of this application.

Figure 3:
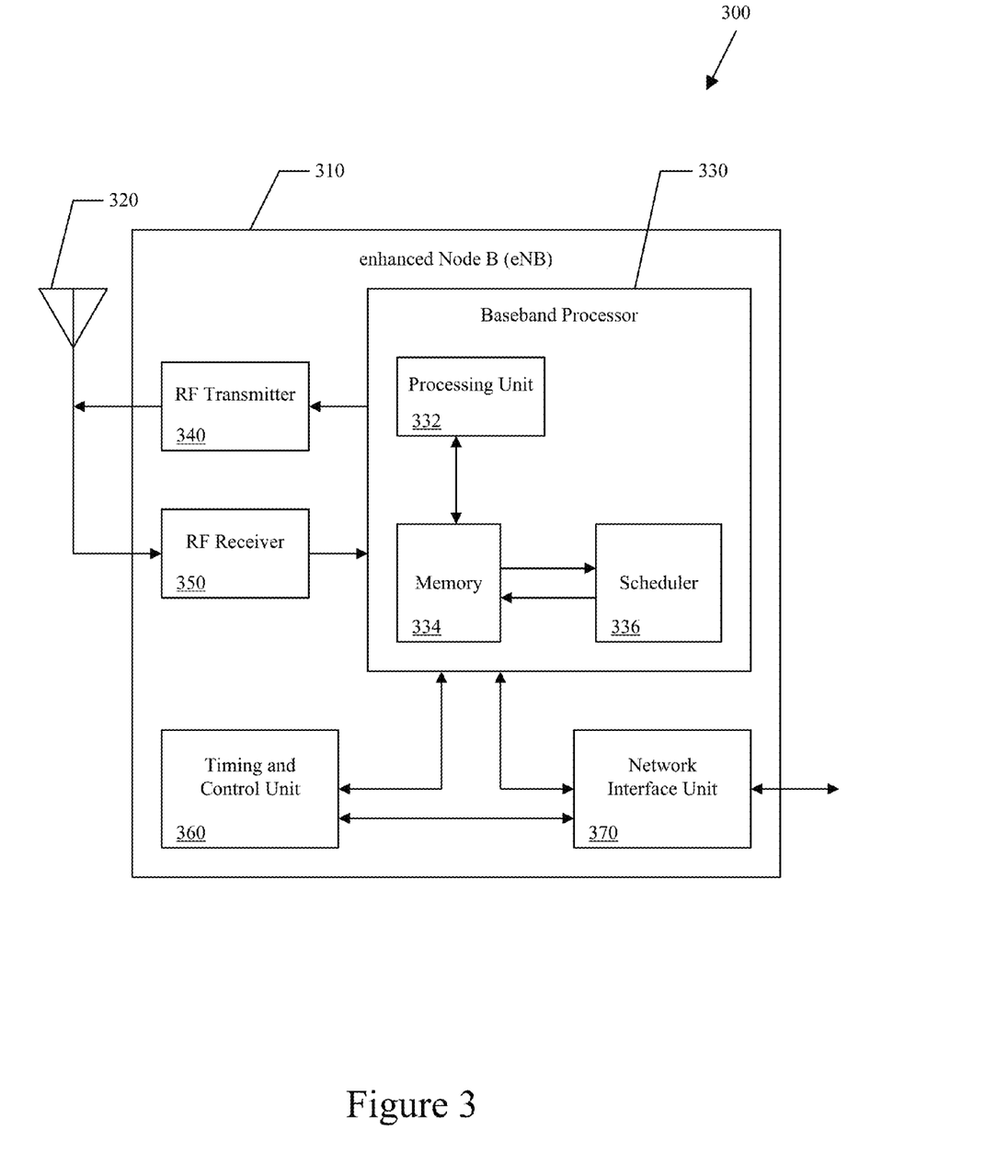
FIG. 3 illustrates a block diagram of an exemplary evolved Node B (eNB) or similar mobile communication node (e.g., base station, access point, etc.) according to certain embodiments.

FIG. 3 illustrates a block diagram 300 of an exemplary evolved Node B (eNB) 310 or similar mobile communication node (e.g., base station, access point, etc.) according to certain embodiments. As shown in FIG. 3, eNB 310 may include a baseband processor 310 to provide radio communication with mobile handsets via a radio frequency (RF) transmitter 340 and RF receiver 330 units coupled to the eNB antenna 320. While only one antenna is shown, certain embodiments are applicable to multi-antenna configurations. RF transmitter 340 and RF receiver 330 may be combined into one, transceiver unit, or duplicated to facilitate multiple antenna connections. Baseband processor 320 may be configured (in hardware and/or software) to function according to a wireless communications standard, such as 3GPP LTE. Baseband processor 320 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a node B, an evolved node B, an access point, a home base station, a femtocell base station, and/or any other type of mobile communications node may be provided by processing unit 332 executing instructions or code stored on a computer-readable data storage medium, such as the memory 334 shown in FIG. 3.

In certain embodiments, eNB 310 may further include a timing and control unit 360 and a core network interface unit 370, such as are shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e.g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on.

Figure 4:
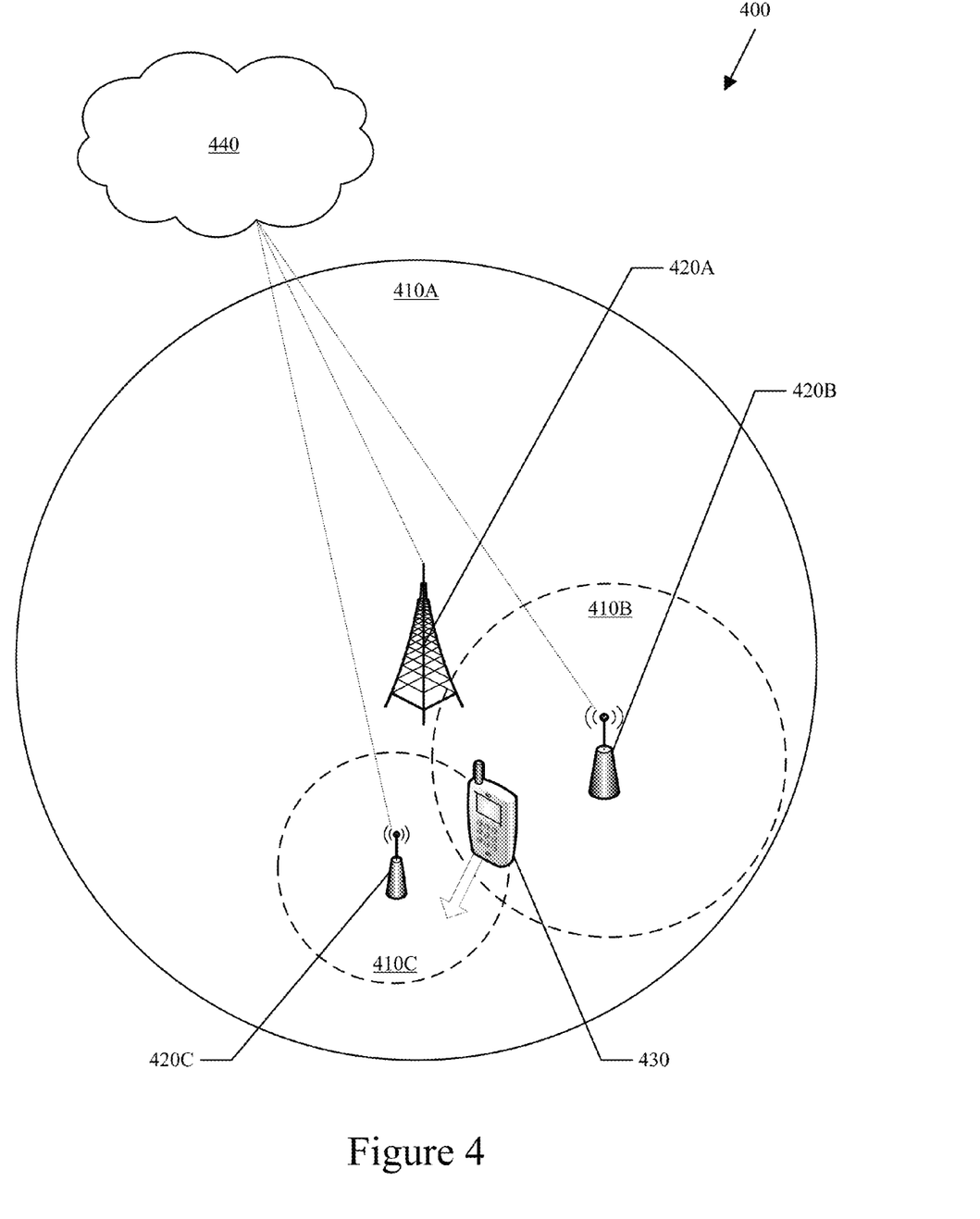
FIG. 4 illustrates an exemplary multi-RAT wireless network environment according to certain embodiments.

FIG. 4 illustrates an exemplary multi-RAT (radio access technology) wireless network environment 400 according to certain embodiments. A multi-RAT wireless network environment 400 may also be called a mixed wireless communication system or a hybrid communication system. As shown in FIG. 4, a mobile device (handset, UE, tablet, mobile, etc.) 430 is within the coverage area of multi-RAT wireless network environment 400. Multi-RAT wireless network environment 400 can include multiple network coverage pieces. For example, the once coverage area can be a cell 410A, such as in an LTE coverage area. Within (or partially within) cell 410A coverage area, there can concurrently exist one or more other coverage areas, or cells 410B and 410C, such as in a GSM, WiMAX, CDMA or even WiMAX or Wi-Fi coverage areas. As shown, cells 410B, 410C are within cell 410A and at least partially overlap each other, although this configuration is for illustrative purposes only. Each cell 410 can also include some sort of network access device 420A, 420B and 420C, such as a base station, eNodeB or access point. Each network access device 420 can communicate with one or more mobile devices 430, as well as with a core network 440. Not shown are possible intermediate network components or system elements that may be between each network access device 420 and core network 440. In certain embodiments, mobile device 430 can be moving within cell 410A and moving out of cell 410B and into cell 410C. In this way, mobile device 430 could possibly communicate with one or more of cells 410A, 410B and 410C.

As previously mentioned, mixed wireless communication system or multi-RAT wireless network environment 400 may have interconnectivity issues, quality of service issues, and similar related problems. An example of these types of problems may be understood in view of a communication system that has a provider, a coverage area, a network, an access point, a cell, etc. that provides only packet based data services and not voice services. Voice services, voice calls, and SMS messages may be considered, broadly speaking, circuit-switched services. Circuit switching may be thought of as two nodes that establish a dedicated channel (circuit) before communication. The "circuit" remains connected for the duration of the session and dedicates, or sets aside, the necessary bandwidth for the session. This allows for high quality of service (QOS) voice conversations. Contrast this to packet switching which divides the data to be transmitted into packets. The packets are then transmitted separately and may be delayed, out of order, and not on a dedicated channel. Thus, packet switching networks are not ideal for providing voice services as the QOS may be relatively poor. The described embodiments herein may be suitable for managing a device in any multi-RAT system where the device may need to disconnect from one network (e.g., a packet-switched network) and reconnect with another network (e.g., a circuit-switched network) to obtain voice, SMS, etc. circuit-switched services. Referring back to FIG. 4, as an example, one or more of coverage areas 410A-410C may be a circuit-switched service area and one or more of coverage areas 410A-410C may be a non-circuit-switched service area.

LTE is a packet-based data service. In certain embodiments, a voice centric device, such as device 116, 122, 200, 430 using an LTE network may want to make a voice call or use circuit-switched services. Device 200, 430 may need to be able to use another network that supports voice services, because LTE strictly speaking does not support it. Thus, Circuit Switched Fall Back (CSFB) technology is developed so that a voice call or a SMS message being delivered to an LTE device can go through via the use of another circuit-switched network (e.g. CDMA2000, GSM, etc.). With CSFB, when an LTE device is used to make or receive a voice call, the device "falls back" to a 3G or 2G network to complete the call or to deliver the SMS message. CSFB technology helps make the transition from non-voice LTE to more advanced voice-over LTE seamless. However, some LTE networks that are deployed do not support CSFB.

A problem can arise when an LTE network (or cell etc.) does not support CSFB. If an LTE network does not support CSFB, it may indicate to the device in a variety of manners that it does not support CSFB. For example, the device may receive a message that says a CS domain is not available. The device may then disconnect the session with the LTE network, camp on a new network, handover, disable the LTE cell, or stay connected to the LTE network and also connect with a network that does support circuit-switched services. Depending on the communication schemes and the protocol versions, the procedure varies and is commonly known in the art. In this situation, when a device starts a session with a circuit-switched network or cell, it may disable the LTE session. However, after some time (e.g., perhaps 12 minutes, but can depend on device realization, etc.), the device may want to scan for an LTE network and reconnect with it (i.e., perhaps for faster data services). Scanning requires, among other things, the need for the radio and processors to be on. Thus scanning may consume valuable device power and may take an unacceptable amount of time.

A device may be in the same coverage area with no LTE cells that support CSFB and the periodic and/or frequent scanning may be a waste of device resources. Solutions to help try and solve this problem have used a simple scan/rescan timer. In this situation, when the device leaves the LTE cell that does not support CSFB, it may wait for a given time period before it scans/rescans for an LTE network. However, as explained above, this timer is ineffective in preventing the device from multiple scans while remaining in a non-CSFB LTE network area. For example, the device may remain in an area where there is no change in the LTE services provided, but continue to scan as the timer continually expires. Moreover, the timer may prevent or delay the device from acquiring an LTE network that supports CSFB if it has moved into an area where CSFB is now supported: e.g., the device may have moved while the timer is still waiting to expire. Thus, the timer can prevent the device from camping on a new LTE CSFB-supported cell until the timer expires. Therefore, a simple timer to indicate to the device when to scan/rescan is not an effective solution. The following certain embodiments describe three main components that may work together, individually or in any combination with each other to supply a method, system, and apparatus that manages a device in a multi-RAT system.

Figure 5:
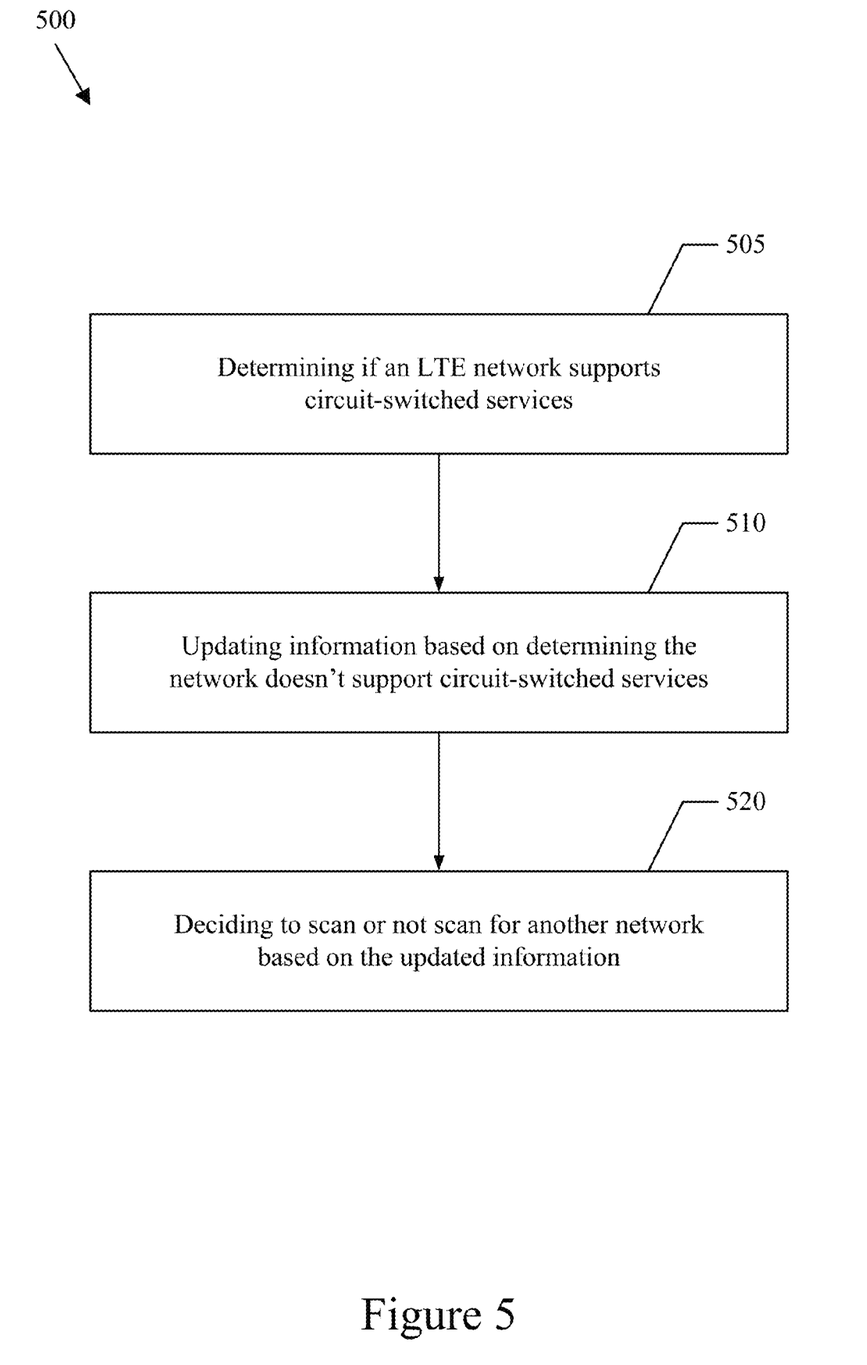
FIG. 5 illustrates an exemplary method according to certain embodiments.

FIG. 5 illustrates an exemplary method 500 according to certain embodiments. A device such as device 200, 430 may look for a packet-based cell or a cell that does not provide circuit-switched services 410A. For example, the device may find an LTE network. In certain embodiments, method 500 at step 505 begins by determining if a network supports circuit-switched services. For example, device 200, 430 may inquire or be informed that LTE cell 410A does not support CSFB. At step 510, device 200, 430 can continue by updating information based on (or at least on) determining the network does not support circuit-switched services. At step 520, device 200, 430 can conclude by deciding to scan or not to scan for another network based on (or at least on) the updated information.

Figure 6:
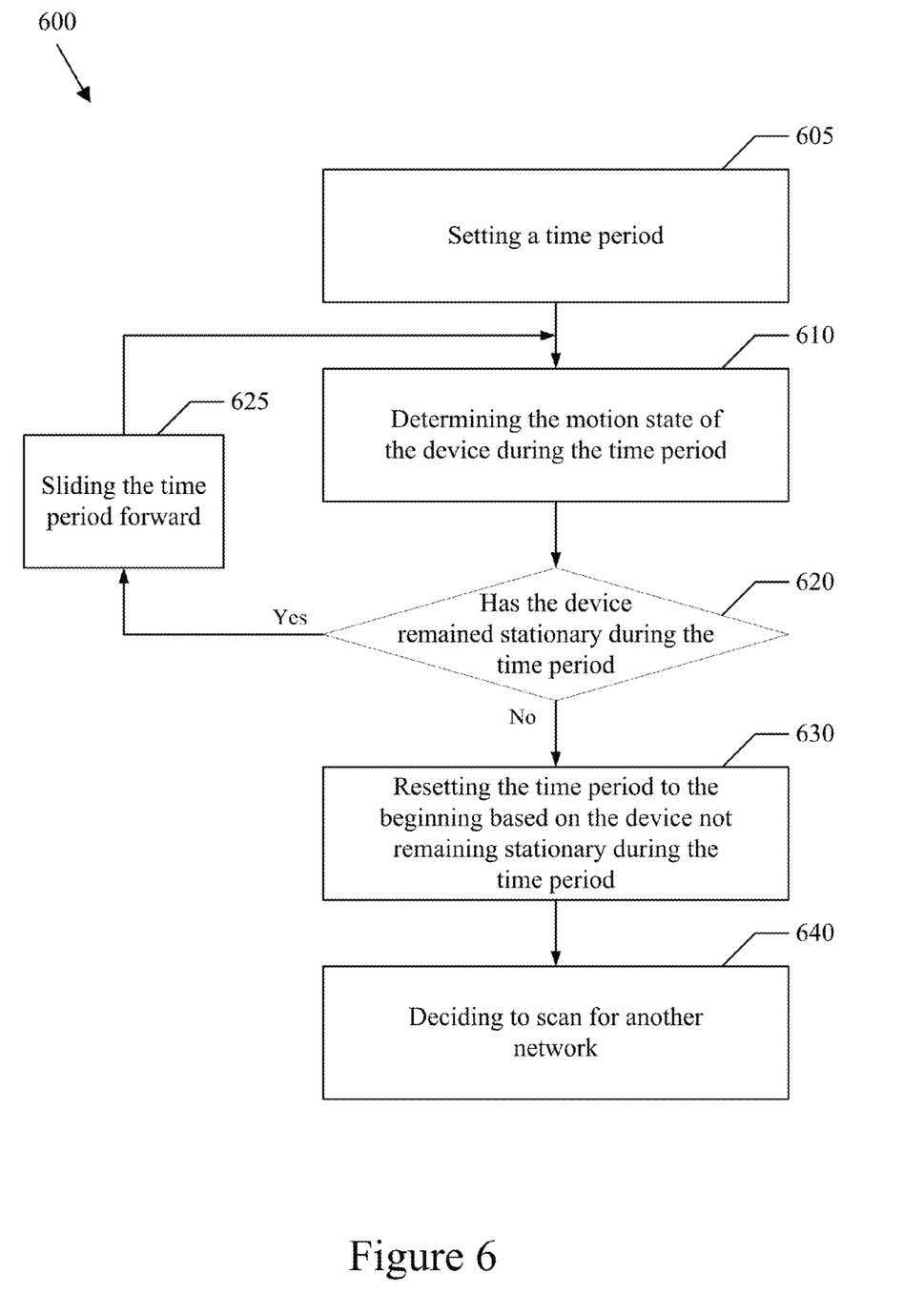
FIG. 6 illustrates an exemplary method of updating information according to certain embodiments.

FIG. 6 illustrates an exemplary method 600 of updating information according to certain embodiments. At step 605, a device, such as device 200, 430, can begin by setting a time period. The time period may be configured and maintained with instructions or code in processor 230 and any associated memory 240. The time period may also be called a time window as is common in the art. The time period may be predetermined, static, dynamic, adjustable, or inferred from historical data. The time period may be pushed to the device from an access point or eNB 310 or indirectly from a core network 440. It may be programmed into the device from a factory setting or set by the device while in use. In certain embodiments, the time period can be two hours or eight hours. In certain embodiments, the time period has a maximum limit that cannot be exceeded. In certain embodiments, the device or server infers from historical data what the time period should be. For example, a certain geographical location may have a time period associated with it that is two hours, while another geographical location may have a time period associated with it that is eight hours. In conjunction, certain times of day and other such parameters may influence the time period and/or the maximum limit for the time period.

As shown in FIG. 6, at step 610, method 600 continues by determining a motion state of the device during the time period. Determining the motion state of the device may be accomplished using well known techniques in the art or unique techniques disclosed herein. For example, the location of the device may be known at the time of the determining if a network supports circuit-switched services by using global positioning services (GPS), wireless area network (WAN) land-based location techniques or a combination of the two. Moreover, accelerometers and motion sensors may be used to help determine the motion state of the device. In addition, a motion state may be determined based on (or at least on) device 200, 430 or access point 310, 410B, or 410C (e.g. server, base station, eNB, etc.) handshaking protocols when entering certain service areas. Also, other motion state detection techniques known in the art and may be used to help determine the motion state.

As shown in FIG. 6, method 600 continues at step 620 with determining if the device has remained stationary during the time period. In certain embodiments, this time period can be 2 hours (but can vary, as described below). Stationary may mean that the device has not moved, has not moved out of an area, or has not moved outside of a serving cell. This may be accomplished at the end of the time period, or at another prescribed time. For example, if the time period is set for two hours, at the end of two hours the device or a server could determine if the device was moving or stationary during those two hours. Also, the motion state can be checked every 6 minutes. In this case, if the motions state keeps stationary in the past 2 hours (as measured previous to each 6-minute check, then trigger the LTE scan. Processor 230, 330 and associated memory 240, 334 may be used to help determine if the device was stationary or moving.

In certain embodiments, at step 630 or FIG. 6, if it is determined that the device has moved, method 600 continues by resetting the time period to the beginning (i.e., to the lowest value or to a lower value) based on (or at least on) the device having not remaining stationary during the just-used time period. Method 600 continues at step 640, with deciding to scan for another network. For example, the device may scan for another LTE network. However, if, after step 620, it is determined that the device has not moved, i.e., remained stationary, then at step 625, method 600 continues by sliding the time period forward (i.e., making the time period larger) and deciding not to scan for another network (i.e., no need to scan, since the device has not moved and would not detect any new networks). After sliding the time period forward, method 600 could continue to step 610, where the device may continue to determine if the device was moving or stationary during the new time period.

In certain embodiments, creating a sliding time period (i.e., forward or backward) to know whether to scan, based on (or at least on) determining whether the device has moved, may facilitate device efficiencies, such as helping to save device power by reducing unnecessary scans. For example, if a device has learned or is informed (or otherwise knows) that it is in an area where no circuit-switched network is supported and it determines that it has not moved out of that area, then the device should not need to scan until some point in the future, when it moves and has a better chance of finding the relevant network. In a sense, a change in the motion state of a device helps trigger or not trigger a scan. This could help improve user experience as well.

A device, UE, etc., may learn that a cell, network, node, access point, etc. may not support circuit-switched services. For example, an LTE eNodeB (or NodeB) may not support CSFB. Device 200, 430 may disable the LTE connection and search for a cell, provider, network, access point, etc. that supports circuit-switched services 310, 410C or 410B. For example, the device may begin a session with a CDMA2000 base station, or a 2G or 3G network and may be using well known techniques (standard protocols) using processor 230 and transceiver 250 to disable, connect or disconnect from various communication schemes.

Figure 7:
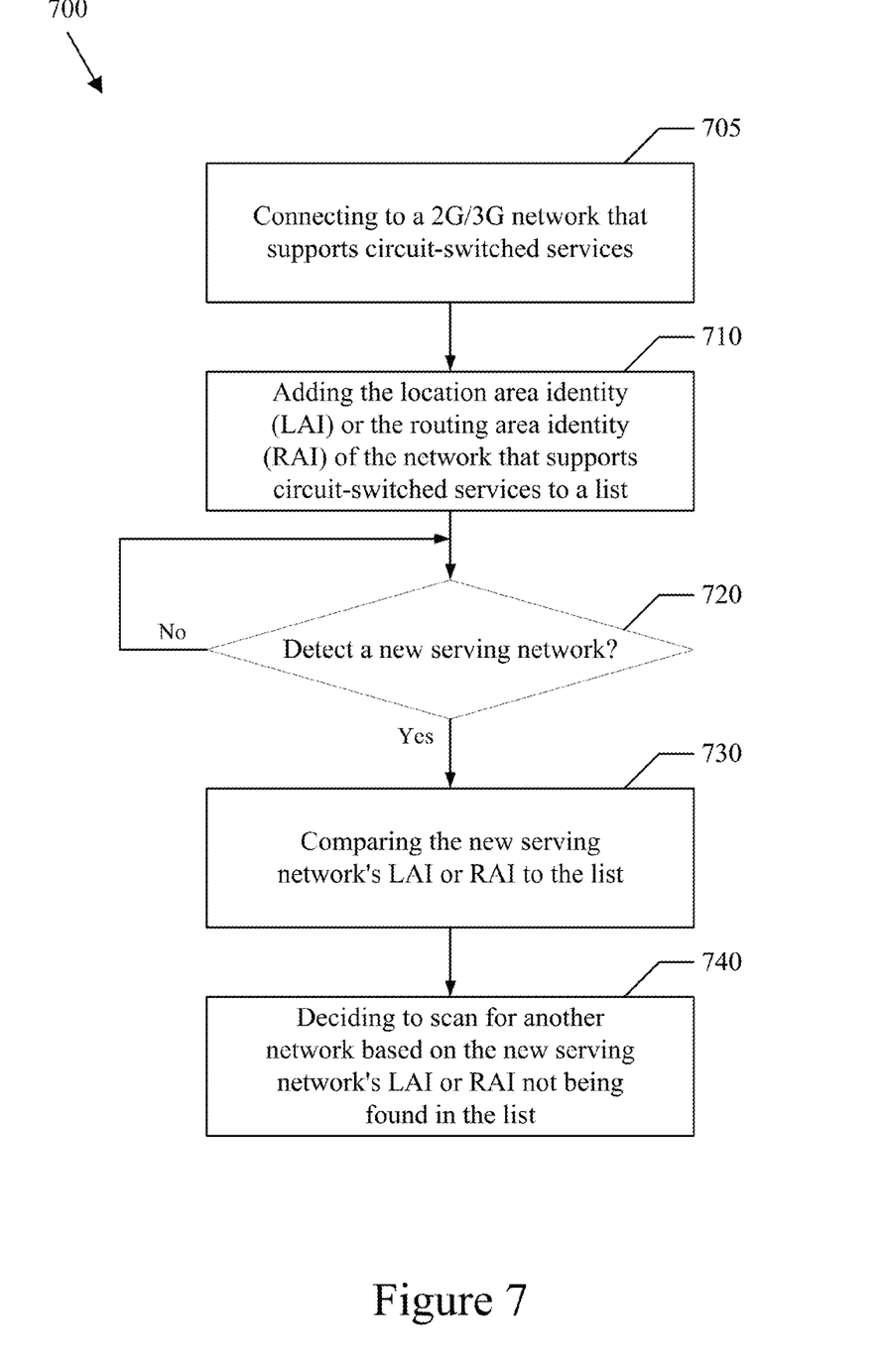
FIG. 7 illustrates an exemplary method of updating information according to certain embodiments.

FIG. 7 illustrates an exemplary method 700 of updating information according to certain embodiments. As shown in FIG. 7, method 700 can begin at step 705 by connecting to a network that supports circuit-switched services. Then at step 710, method 700 can continue by adding the location area identity (LAI) and/or the routing area identity (RAI) of the network that supports circuit-switched services to a list. The list may be a "CSFB black-list." The list may comprise more information than just LAI, RAI or both LAI and RAI information. The list may also contain information about whether circuit-switched services are supported. The list may comprise IP address information or cell identification information. The list may be a list as defined in a protocol standard or may be a custom made list. Initial information may be obtained from a server and added into a list and the mobile may update the list thereafter, or the list may be continually updated by a server. The device may generate the initial information in the list and maintain the information in the list thereafter. The list may be created and stored via utilizing the processor 230, 330 and associated memory 240, 334 in the form of instructions or code.

In certain embodiments, at step 720 or FIG. 7, method 700 continues with detecting a new serving network. The mobile may detect a serving cell with well-known protocol standard techniques or unique techniques as disclosed herein. For example, when a device typically enters a new cell coverage area there is handshaking, discovery, and sharing of access information between the two devices. A beacon or pilot may be broadcast from a Wi-Fi access point. These discovery and/or access protocols may be different depending on the communication scheme, but device 200, 430 and server 300, 420B may utilize them to achieve the purpose of detecting a new serving cell or network. If the device does not detect a new serving network, then method 700 loops back to perform step 720 again, until a new serving network is detected.

In certain embodiments, at step 730 or FIG. 7, once a new service network is detected, method 700 continues by comparing the new serving network's LAI or RAI to the list. At step 740, if the detected new serving network's LAI or RAI is not found in the list, then the process concludes with deciding to scan for another new network. The mobile for example, may scan for an LTE cell or network. The mobile may decide not to scan for another network based upon the detected new serving network's LAI or RAI being found in the list. Certain embodiments may help reduce unnecessary scans and may save power by using the identity of serving cells that support voice services to help locate areas of non-CSFB LTE coverage areas. In a sense, updated information of cells (like 2G and 3G) that support voice may help to identify areas of non-CSFB support and may help the device to know when to trigger or not trigger a scan. Thus, certain embodiments may reduce the number of scans and may help conserve power. This may improve user experience as well.

Figure 8:
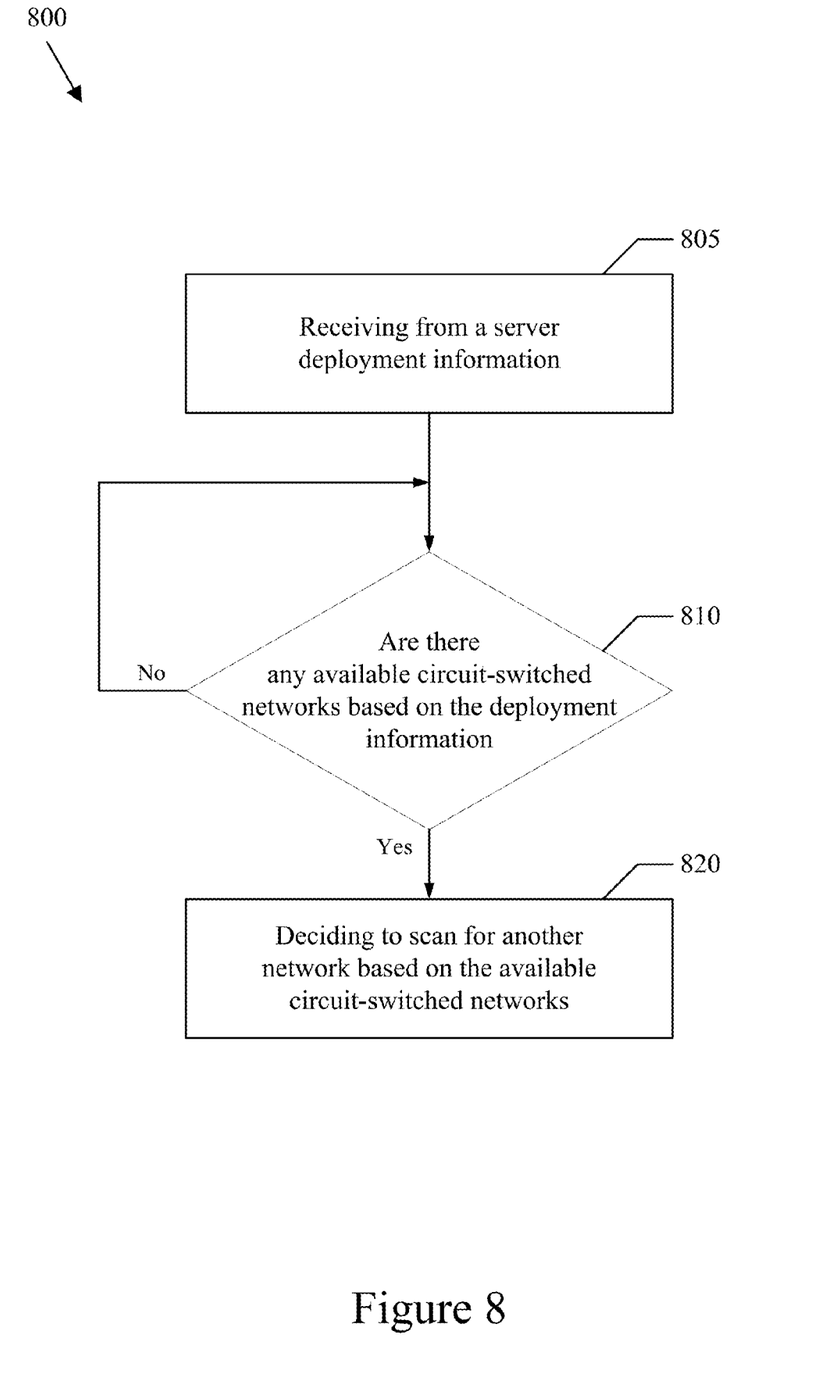
FIG. 8 illustrates an exemplary method of updating information according to certain embodiments.

FIG. 8 illustrates an exemplary method 800 of updating information according to certain embodiments. Device 200, 430 may receive network information from a server through an access point, or base station, 310, 410A, 410B or 410C etc. This information may be in the form of deployment information. Deployment information may comprise, for example, information about where cells are located, what coverage areas they cover, what types of services they support, and so on. More specification, the deployment information can be a matrix list, which includes public land mobile network (PLMN)/LAI/RAI/CSFB Capability (true/false)/and so on. As shown in FIG. 8, method 800 can begin at step 805 by receiving deployment information from a server. The deployment information may be for any network or cell about which a device may want to know. In other words, the deployment information does not need to be for only communications schemes the device is enabled to utilize. The device may be able to receive the deployment information indirectly from a core network 440.

In certain embodiments, method 800 continues at step 810 by determining if there are any available circuit-switched networks based on (or at least on) the deployment information. For example, the deployment information may indicate that an LTE cell in a given geographical area supports CSFB or does not support CSFB. If there are no available circuit-switched networks at the device's current location, then method 800 can loop back to repeat step 810. If there are available circuit-switched networks, then method 800 can continue at step 820 by deciding to scan for another network based on (or at least on) the available circuit-switched networks. For example, a mobile in a given geographical area may decide to scan after determining that the areas it is located within comprises cells that support CSFB. Moreover, a device may decide not to scan for another network based upon the unavailability of circuit-switched networks determined. For example, the deployment information may have indicated that no cells in the given geographical location support CSFB. Thus, certain embodiments using additional information about the area of coverage a mobile is located within may help a device reduce the number of scans and may help the device conserve power. This may improve user experience as well.

Figure 9:
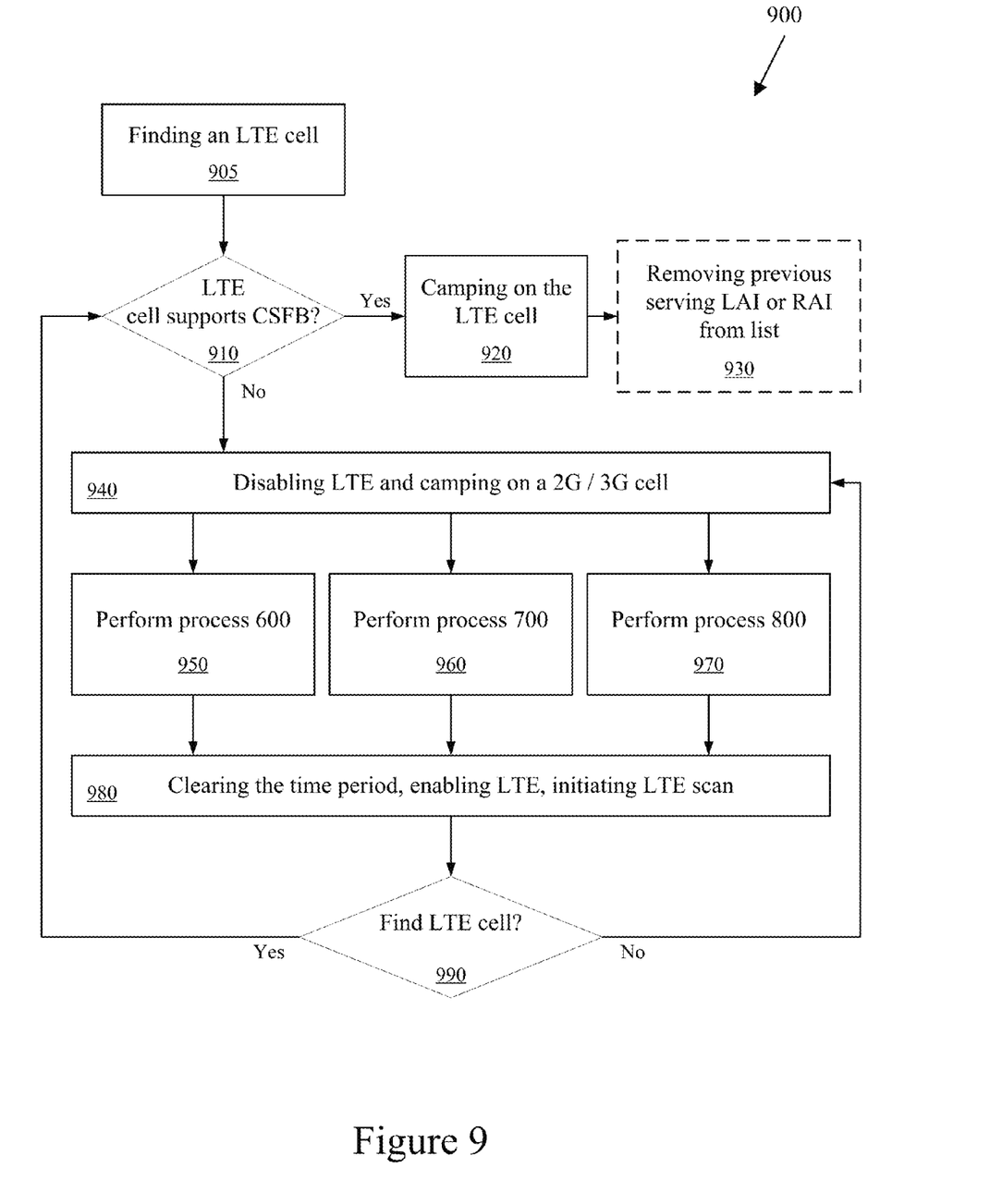
FIG. 9 illustrates an exemplary flow chart of the previously-discussed methods working in combination or individually according to certain embodiments.

In certain embodiments, as mentioned previously, the previously discussed methods may all work together, individually, or in any combination with each other to supply a method, system, and apparatus that manages a device in a hybrid communication system. FIG. 9 illustrates an exemplary flow chart 900 of the previously-discussed methods working in combination or individually according to certain embodiments. An LTE network is used as an example. Processor 230, 330 and associated memory 240, 334 may be utilized with instructions or code to help perform the steps of flow chart 900.

As shown in FIG. 9, flow chart 900 can begin at step 905 with finding an LTE cell. Then, at step 910, flow chart 900 can continue by determining whether the LTE cell supports CSFB. If the cell supports CSFB, then at step 920, flow chart 900 can continue by camping on the LTE cell. Optionally, at step 930, flow chart 900 can continue by removing the previous serving cell's LAI or RAI from the list. If the cell does not support CSFB, then at step 940, flow chart 900 can continue by disabling LTE and camping on a 2G or 3G cell. In certain embodiments, after camping on the 2G or 3G cell, the device performing flow chart 900 may perform any one, two or three of the steps 950, 960, 970, which represent previously discussed methods 600, 700, 800, respectively. In certain embodiments, at step 980, flow chart 900 can continue by resetting or clearing the time period, enabling LTE, and initiating an LTE scan. At step 990, flow chart 900 can continue by determining if an LTE cell has been found. If an LTE cell has been found, then the flow chart 900 can continue at step 910. If an LTE cell has not been found then flow chart 900 can continue at step 940.

Figure 10:
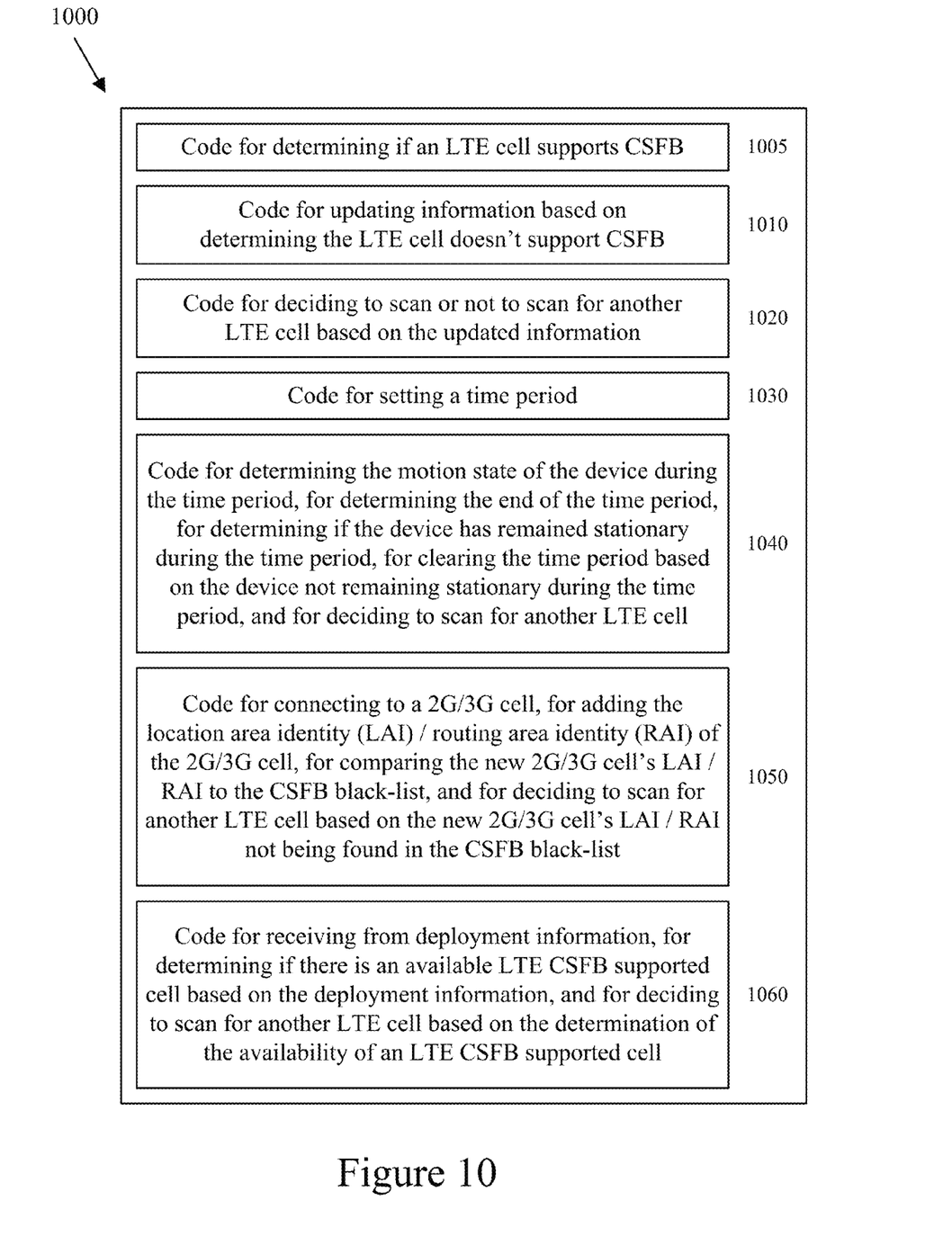
FIG. 10 illustrates an exemplary computer-program storage apparatus according to certain embodiments.

FIG. 10 illustrates an exemplary computer-program storage apparatus 1000 according to certain embodiments. Computer-program storage apparatus may be the circuitry and/or processor 230 and associated memory 240. Computer-program storage apparatus 1000 may comprise at least one memory having one or more software modules stored thereon, the one or more software modules being executable by one or more processors and the one or more software modules comprising code or instructions. In certain embodiments, computer-program storage apparatus 1000 comprises code for determining if an LTE cell supports CSFB 1005, code for updating information based on (or at least on) determining the LTE cell does not support CSFB 1010, and code for deciding to scan or not to scan for another LTE cell based on (or at least on) the updated information 1020. In certain embodiments, computer-program storage apparatus 1000 comprises code for setting a time period 1030.

In certain embodiments, computer-program storage apparatus 1000 comprises code for determining the motion state of the device during the time period, code for determining the end of the time period, code for determining if the device has remained stationary during the time period, code for clearing the time period based on (or at least on) the device not remaining stationary during the time period, and code for deciding to scan for another LTE cell 1040.

In certain embodiments, computer-program storage apparatus 1000 comprises code for connecting to a 2G or 3G cell, code for adding the location area identity (LAI) or the routing area identity (RAI) of the 2G or 3G cell to a CSFB black-list, code for detecting a new 2G or 3G cell, code for comparing the new 2G or 3G cell's LAI or RAI to the CSFB black-list, and code for deciding to scan for another LTE cell based on (or at least on) the new 2G or 3G cell's LAI or RAI not being found in the CSFB black-list 1050.

In certain embodiments, computer-program storage apparatus 1000 comprises code for receiving from deployment information, code for determining if there is an available LTE CSFB supported cell based on (or at least on) the deployment information, and code for deciding to scan for another LTE cell based on (or at least on) the determination of the availability of an LTE CSFB supported cell 1060.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of this disclosure.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is noted that certain embodiments may be described as a process, method or flow that is depicted as a flowchart, a flow diagram, a structure diagram or a block diagram. Although a flowchart may describe the operations as a sequential process or method, many of the operations can be performed in parallel or concurrently. In addition, the order of the operations may be re-arranged. A process is terminated when its operations are completed. A process may correspond to a method, a function, a procedure, a subroutine, a subprogram, etc. either in hardware, software, firmware or any combination thereof.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A method for managing a device in a mixed wireless communication system, comprising:
   determining if a first network supports circuit-switched (CS) services;
   based at least on determining that the first network does not support circuit-switched services:
      connecting to a second network that supports circuit-switched services;
      adding at least one of a location area identity (LAI) and a routing area identity (RAI) of the second network to a circuit-switched fall back (CSFB) black-list;
      detecting a new serving network; and
      comparing at least one of the new serving network's LAI and RAI to the respective LAI and RAI in the CSFB black-list; and
   determining to scan for another network when at least one of the new serving network's LAI and RAI is not found in the CSFB black-list.

2. The method of claim 1, further comprising:
   setting a time period;
   determining a motion state of the device during the time period;
   at the end of the time period, determining if the device has remained stationary during the time period based at least on the determined motion state;
   resetting the time period to the beginning based at least on the device not remaining stationary during the time period; and
   deciding to scan for another network.

3. The method of claim 2, further comprising:
   sliding the time period forward in time based at least on the device remaining stationary during the time period; and
   deciding not to scan for another network.

4. The method of claim 2, wherein the time period is at least one time selected from a time group including: a two hour period, an eight hour period, and a maximum period.

5. The method of claim 1, further comprising:
deciding not to scan for another network based at least in part upon at least one of the new serving network's LAI and RAI being found in the CSFB black-list.

6. The method of claim 1, further comprising:
receiving deployment information from a server;
determining if there are any available CS networks based at least on the deployment information; and
deciding to scan for another network based at least on the determined available CS network.

7. The method of claim 6, further comprising:
deciding not to scan for another network based upon the determined unavailability of a CS network.

8. The method of claim 1, wherein the new serving network is an LTE (3GPP long term evolution) network.

9. The method of claim 1, wherein the CSFB black-list includes information indicating whether each network supports CS services.

10. An apparatus for managing a device in a hybrid wireless communication system, comprising:
a transceiver configured to receive and transmit to and from an LTE (3GPP long term evolution) cell and a 2G/3G cell;
a memory; and
at least one processor coupled to the transceiver and the memory, configured to:
determine if the LTE cell supports circuit-switched fallback (CSFB),
based at least on determining the LTE cell does not support CSFB:
connect to a first 2G/3G cell,
add at least one of a location area identity (LAI) and a routing area identity (RAI) of the first 2G/3G cell to a black-list,
detect a new 2G/3G cell, and
compare at least one of the new 2G/3G cell's LAI and RAI to the black-list, and
decide to scan for another LTE cell when at least one of the new 2G/3G cell's LAI and RAI is not found in the black-list.

11. The apparatus of claim 10, wherein the at least one processor is further configured to:
create a time window,
determine a motion state of the device during the time window,
determine the time window is full,
determine if the device has remained stationary during the time window based at least on the time window determined to be full,
clear the time window based at least on the device not remaining stationary during the time window, and
decide to scan for the another LTE cell.

12. The apparatus of claim 11, wherein the at least one processor is further configured to:
slide the time window forward based at least on the device remaining stationary during the time window, and to decide not to scan for another LTE cell.

13. The apparatus of claim 11, wherein the at least one processor is further configured to:
decide not to scan for another LTE cell based upon the determined unavailability of an LTE CSFB supported cell.

14. The apparatus of claim 10, wherein the at least one processor is further configured to:
decide not to scan for another LTE cell based at least upon at least one of the new 2G/3G cell's LAI and RAI being found in the black-list.

15. The apparatus of claim 10, wherein the at least one processor is further configured to:
receive deployment information,
determine if there are any available LTE CSFB supported cells based at least on the deployment information, and
decide to scan for another LTE cell based at least on the determined availability of an LTE CSFB supported cell.

16. The apparatus of claim 10, wherein the black-list includes IP address information or cell identification information for each network on the black-list.

17. A computer-program storage apparatus for managing a device in wireless communication system comprising at least one memory having one or more software modules stored thereon, the one or more software modules being executable by one or more processors and the one or more software modules comprising:
code for determining if an LTE (3GPP long term evolution) cell supports circuit-switched fallback (CSFB);
code for based at least on determining the LTE cell does not support CSFB:
code for connecting to a 2G/3G cell;
code for adding a location area identity (LAI) or a routing area identity (RAI) of the 2G/3G cell to a CSFB black-list;
code for detecting a new 2G/3G cell; and
code for comparing the new 2G/3G cell's LAI or RAI to the CSFB black-list; and
code for deciding to scan for another LTE cell when the new 2G/3G cell's LAI or RAI is not found in the CSFB black-list.

18. The computer-program storage apparatus of claim 17, further comprising:
code for setting a time period;
code for determining a motion state of the device during the time period;
code for determining the end of the time period;
code for determining if the device has remained stationary during the time period;
code for clearing the time period based at least on the device not remaining stationary during the time period; and
code for deciding to scan for another LTE cell based at least on the device not remaining stationary during the time period.

19. The computer-program storage apparatus of claim 17, wherein the one or more software modules further comprise:
code for receiving from deployment information;
code for determining if there is an available LTE CSFB supported cell based at least on the deployment information; and
code for deciding to scan for another LTE cell based at least on the determination of the availability of an LTE CSFB supported cell.

20. The computer-program storage apparatus of claim 17, wherein the one or more software modules further comprise:
code for receiving an update to the CSFB black-list from a server; and
code for implementing the update to the CSFB black-list from the server.

* * * * *

UNITED STATES PATENT AND TRADEMARK OFFICE
CERTIFICATE OF CORRECTION

PATENT NO. : 9,794,832 B2  
APPLICATION NO. : 14/503229  
DATED : October 17, 2017  
INVENTOR(S) : Yaoqi Yan et al.

Page 1 of 1

It is certified that error appears in the above-identified patent and that said Letters Patent is hereby corrected as shown below:

In the Claims

Column 14, Claim 17, Line 22, please delete "code for based at least" and substitute -- based at least --.

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*